United States Patent [19]
Blanc et al.

[11] Patent Number: 5,409,194
[45] Date of Patent: Apr. 25, 1995

[54] VARIABLE FLOW ELECTRICALLY CONTROLLED VALVE

[75] Inventors: Alain Blanc, Bourg les Valence; Denis Girardin, Alixan; Jean Vollot, Saint Georges les Bains; Georges Astic, St Marcel-les-Valence; Didier Dejoux, Crest, all of France

[73] Assignee: Crouzet Electromenager, Valence, France

[21] Appl. No.: 970,407

[22] Filed: Oct. 30, 1992

Related U.S. Application Data

[63] Continuation-in-part of Ser. No. 683,378, Apr. 11, 1991.

[30] Foreign Application Priority Data

Apr. 12, 1990 [FR] France ................. 90 04967
Feb. 18, 1992 [FR] France ................. 92 02186

[51] Int. Cl.⁶ .............. F16K 31/04; F16K 7/06; F16K 31/53
[52] U.S. Cl. ............... 251/9; 251/129.11; 251/249.5; 251/250.5
[58] Field of Search ............ 251/6, 7, 8, 9, 129.01, 251/129.04, 129.11, 129.12, 249.5, 250.5; 604/245, 250, 253, 246; 137/486, 487.5, 2, 624.11, 624.13, 624.15

[56] References Cited

U.S. PATENT DOCUMENTS

| | | | |
|---|---|---|---|
| 628,391 | 7/1899 | Clarke | 251/9 |
| 2,895,652 | 7/1959 | Giepen | 222/452 |
| 2,927,582 | 3/1960 | Berkman et al. | 422/45 |
| 3,335,753 | 8/1967 | Kiser | 137/624.11 |
| 3,800,794 | 4/1974 | Georgi | 604/253 |
| 3,839,662 | 10/1974 | N'Guyen Van | 251/129.12 |
| 3,994,294 | 11/1976 | Knute | 251/9 |
| 4,097,786 | 6/1978 | Lund | 251/129.11 |
| 4,099,700 | 7/1978 | Young | 251/129.11 |
| 4,099,704 | 7/1978 | Okumura et al. | 251/129.12 |
| 4,137,940 | 2/1979 | Faisandier | 137/486 |
| 4,191,359 | 3/1980 | Andersson et al. | 251/9 |
| 4,203,573 | 5/1980 | Boss | 251/249.5 |
| 4,261,388 | 4/1981 | Shelton | 137/487.5 |
| 4,273,260 | 6/1981 | Bush | 222/135 |
| 4,397,642 | 8/1983 | Lamadrid | 251/6 |
| 4,452,273 | 6/1984 | Hanzawa et al. | 604/253 |
| 4,493,710 | 1/1985 | King et al. | 604/250 |
| 4,509,943 | 4/1985 | Hanzawa | 604/67 |
| 4,559,036 | 12/1985 | Wunsch | 604/250 |
| 4,601,702 | 7/1986 | Hudson | 604/250 |
| 4,613,798 | 9/1986 | Baumann | 251/129.11 |
| 4,637,817 | 1/1987 | Archibald et al. | 604/250 |
| 4,694,861 | 9/1987 | Goodale | 251/7 |
| 4,820,281 | 4/1989 | Lawler, Jr. | 604/65 |
| 4,827,970 | 5/1989 | Sugisaki et al. | 604/253 |
| 4,909,786 | 3/1990 | Gijselhart et al. | 604/253 |
| 5,186,057 | 2/1993 | Everhart | 604/253 |

FOREIGN PATENT DOCUMENTS

8335587 6/1987 Germany.

*Primary Examiner*—George L. Walton
*Attorney, Agent, or Firm*—Lowe, Price, LeBlanc & Becker

[57] ABSTRACT

A method for controlling a valve including a direct current motor acting upon an aperture adjusting part (3) against the force of elastic means (11) biasing the aperture adjusting part towards a zero flow rest position, comprising the steps of: selecting a desired valve aperture; determining a time interval ($T_a$) as a function of the desired valve aperture; supplying the motor with a first constant current of a sufficient value for rotating the motor, during the mentioned time interval; supplying the motor with a second constant low value current thereafter until a next valve aperture is selected, this low value current being sufficient to hold the motor in its position against the force of the elastic means.

10 Claims, 5 Drawing Sheets

VARIABLE FLOW ELECTRICALLY CONTROLLED VALVE

This application is a Continuation-in-Part application of Ser. No. 07/683,378, filed Apr. 11, 1991.

BACKGROUND OF THE INVENTION

The present invention generally relates to variable flow electrically controlled valves.

When it is desired to control the flow rate of a liquid or gaseous fluid, a variable valve controlled, for example, electrically, is used. Such a variable flow valve comprises an aperture that is variable between a minimum value, for example a zero value corresponding to the closed valve, and a maximum value corresponding to a completely open valve. An electromagnetic device, for example an electromagnet or an electric motor, controls the aperture value of the valve.

The invention more particularly relates to electrically controlled valves of a simple and inexpensive design, these valves being liable to be used in apparatuses manufactured in mass production and at a low cost.

The invention more precisely relates to a specific type of valve comprising a tube of elastic material to which is associated a control mechanism generating a variable elastic flattening of the tube to control the flow rate of a fluid flowing through the tube. When the tube is fully flattened, it is obstructed and the valve is in its closed position.

This type of valve enables to continuously control the flow rate of a fluid between a zero and a maximum value. The control mechanism must adjust the position of a part designed to pinch the tube. To achieve such a position adjustment, conventional means used in the art are complex. For example, as disclosed in U.S. Pat. No. 4,397,642, a stepper motor is servo-controlled as a function of the flow measured in a pinched tube by a sensor. A stepper motor, associated only to its driver circuit, is already expensive in itself. An additional servo-control system makes the cost prohibitive for mass produced apparatuses.

SUMMARY OF THE INVENTION

An object of the invention is to provide a variable flow electrically controlled valve, which is simpler and less expensive than the valves known in the art.

Another object of the invention is to provide a particularly simple control circuit for such a valve.

The invention achieves these objects by providing a specific type of valve, controlled according to a specific method.

A variable flow electrically controlled valve according to the invention comprises, in a housing, a tube made of elastic material through which a fluid can flow, and a control device causing a variable pinching of the tube. The control device includes a valve aperture adjusting part mounted on an articulation of the housing and comprising a pressing area to pinch said tube as well as a toothed sector centered on the axis of the articulation. An elastic means biases the aperture adjusting part towards a full pinching position of the tube. A pinion is mounted to rotate in said housing and forms with the toothed sector a meshed gear. A direct current electric motor is provided for rotating said pinion to move the aperture adjusting part against the force of the elastic means.

According to the invention, the above valve is controlled according to a method comprising the steps of: selecting a desired valve aperture; determining a time interval as a function of the desired valve aperture; supplying the motor with a first constant current of a sufficient value for rotating the motor, during the mentioned time interval; supplying the motor with a second constant low value current thereafter until a next valve aperture is selected, this low value current being sufficient to hold the motor in its position against the force of the elastic means.

The invention also provides for a control circuit operating according to the above method. This circuit comprises a voltage variation detector receiving as an input a valve aperture reference voltage and providing a detection signal at an active state as long as the reference voltage varies. A temporizer is operable to be initialized by the mentioned active state and to count a delay determined by the reference voltage. Means are associated to said temporizer for providing the motor with a zero voltage as long as said detection signal is active, with a voltage sufficient for rotating the motor when the temporizer counts its delay, and with a voltage sufficient for maintaining the motor in its position at the end of said delay.

Using an electric dc motor both to displace the control part serving to pinch the tube and to maintain it in a determined position provides a very cheap device because few and little sophisticated components are used.

BRIEF DESCRIPTION OF THE DRAWINGS

The foregoing and other objects, features and advantages of the invention will be apparent from the following detailed description of preferred embodiments as illustrated in the accompanying figures wherein.

DETAILED DESCRIPTION OF THE INVENTION

Figure 1:
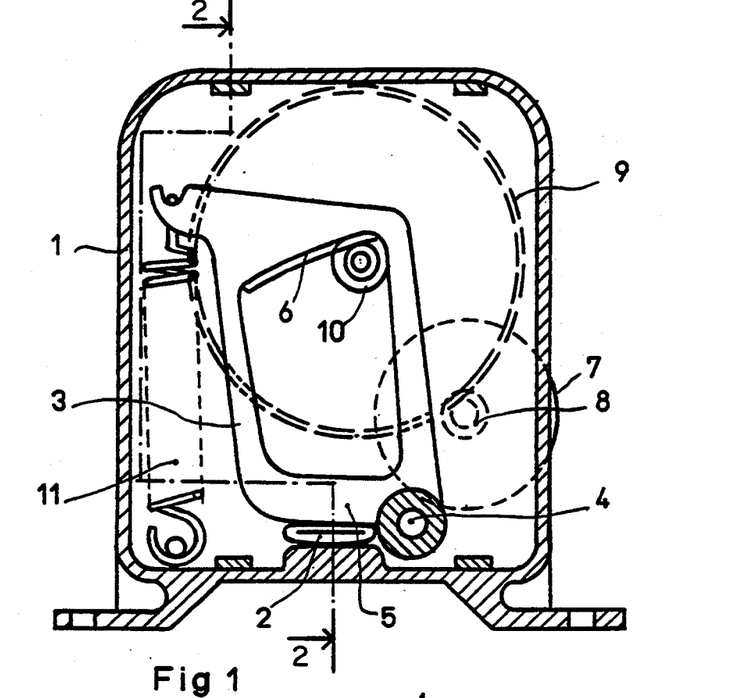
FIG. 1 is a section view along line A—A of FIG. 2 of a variable flow valve according to the invention, in closed position.
Figure 2:
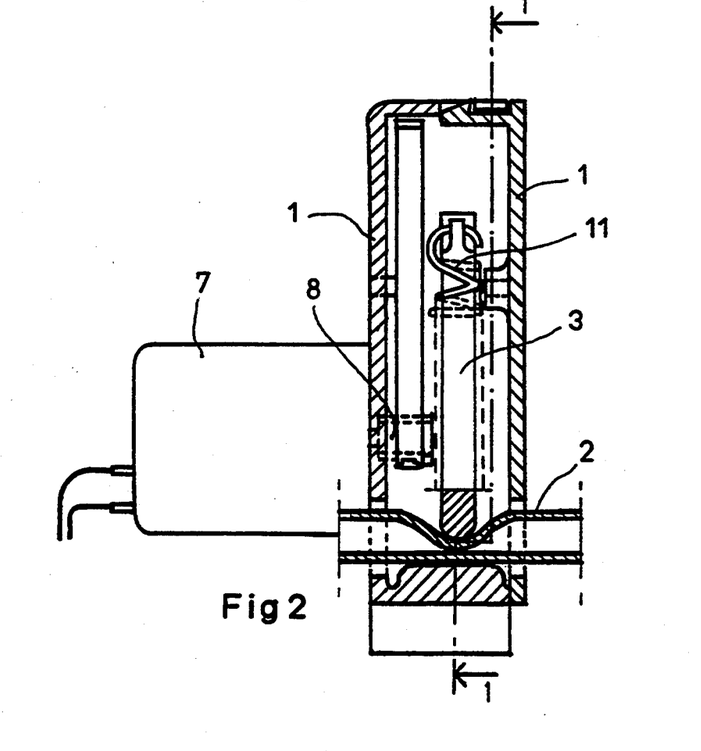
FIG. 2 is a section view along line B—B of FIG. 1.

Referring to FIGS. 1 and 2 that show the same variable valve according to the invention in the closed position, there is shown a housing 1 including the whole control mechanism described in detail hereinafter. The housing 1 is crossed by a tube 2 of elastic material. The valve inlet and outlet are constituted by the two extremities of tube 2, respectively. The valve is in closed position because the tube is fully flattened inside housing 1, which prevents fluid from flowing in the tube.

The control device comprises a flow control part 3 mounted on an articulation 4 in housing 1. The control part 3 can pivot about the articulation 4 within the limits of the allowed movement in housing 1. The control part 3 comprises a pressing area 8 for pinching or flattening tube 2 to decrease the flow rate. When the control part 3 is moved counter-clockwise (as shown in FIG. 1) to its maximum displacement, the pressing area 5 fully closes the tube. This position of the control part 3 is shown in FIGS. 1 and 2.

Figure 3:
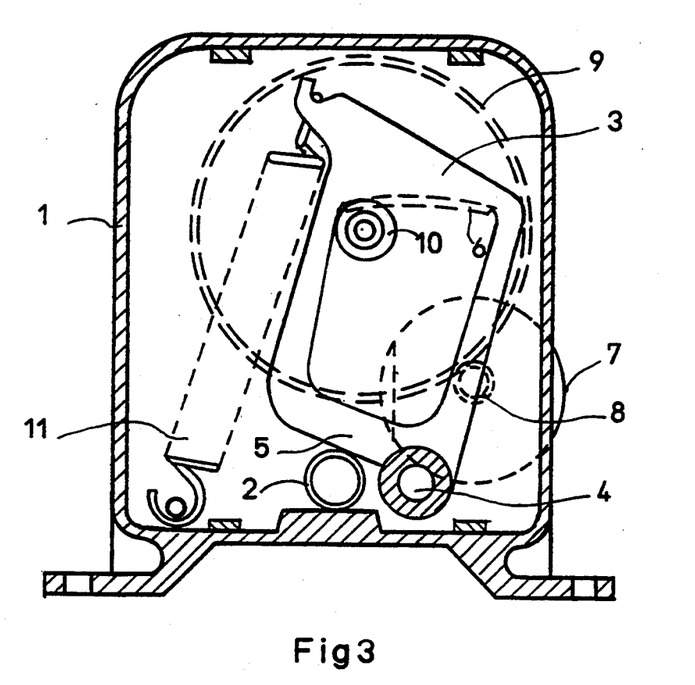
FIG. 3 shows the same valve as that of FIG. 1 but in open position.

In FIG. 3, the control part 3 is moved clockwise to its maximum position, so that the pressing area 5 practically no longer pinches the tube 2. This position corresponds to the full aperture of the valve.

The control part 3 comprises a toothed sector 6 centered on the axis of the articulation 4. A dc motor 7 is rigidly fixed to the external wall of housing 1 and its shaft, on which a pinion 8 is mounted, passes through the wall of housing 1, the pinion 8 being inside housing 1. The rotation of the driving pinion 8 causes, through first and second series reducing gears, the rotation of the control part 3 about the articulation 4. The first gear is composed of pinion 8 meshed with a toothed wheel 9 and the second gear is composed of a pinion 10 rigidly coupled to the toothed wheel 9 and meshed with the toothed sector 6 of the control part 3. If the radii of pinions 8 and 10 are relatively small and the radii of the toothed wheel 9 and toothed sector 6 relatively high, the first and second gears thus formed provide a significant gear reduction.

The control part 3 comprises an anchorage point for a traction spring 11, the other end of which is fixed to the housing 1. Spring 11 is arranged to apply on the control part 3 a torque tending to obstruct the tube 2 by pinching. The first and second gears are reversible, that is, without any electric supply of motor 7, the control part 3, urged by the spring 11, starts rotating counter-clockwise until it comes to a closed position, as shown in FIGS. 1 and 2, where it obstructs tube 2.

When the dc motor 7 is powered, pinion 8 rotates counter-clockwise, which drives the control part 3 clockwise. If the electric power supply of motor 7 is so maintained, the control part 3 slowly rotates at a substantially constant speed until it abuts against its extreme position corresponding to the full aperture of the valve, as shown in FIG. 3.

The invention does not only consist in the mechanical parts of the above described electrically controlled valve, but also in a particular method, described hereunder, for controlling the valve dc motor. Moreover, this method according to the invention can also be implemented with other electrically controlled valves, provided they have a dc control motor and a spring urging a flow (or aperture) adjusting part (3) towards a rest position.

Figure 4A:
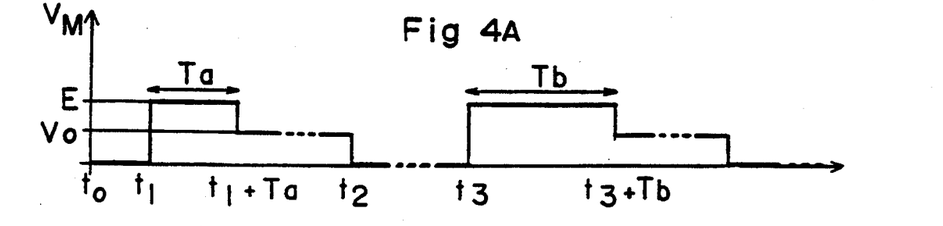
FIG. 4 is a diagram illustrating the relation between the control power of the valve according to the invention and the resulting flow rate.
Figure 4B:
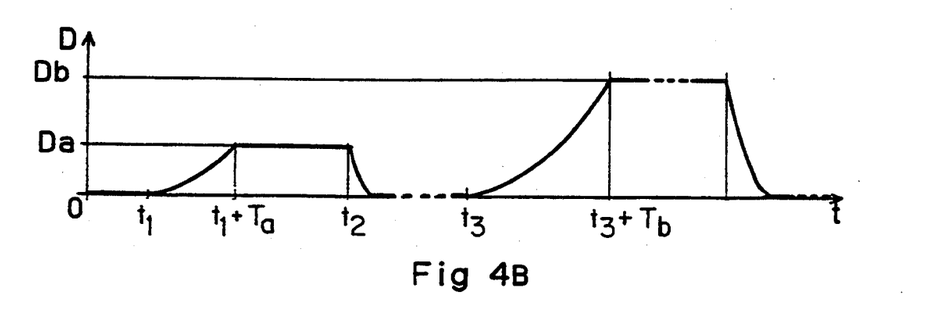

FIG. 4 shows a waveform, illustrating the control method according to the invention, of the voltage $V_M$ that must be applied to the motor to obtain two different flows. It is supposed that the current flowing through the motor follows approximately the same waveform. At a time $t_0$, voltage $V_M$ is zero, which corresponds to the rest position of the motor and to a zero flow. At a time $t_1$, a first flow is to be established. Voltage $V_M$ reaches a voltage E corresponding to the nominal voltage of the motor, or at least sufficient for rotating the motor against the force of spring 11. Value E is maintained for a time interval $T_a$ during which the motor achieves a certain number of revolutions corresponding to a predetermined position of the control part 3 and thus to an associated flow $D_a$. At the end of interval $T_a$, at a time $t_1+T_a$, voltage $V_M$ is lowered down to a value $V_0$ that is not sufficient for rotating the motor but which is sufficient to maintain the motor in its position against the force of spring 11.

At a time $t_2$, it is desired, for example, to increase the flow. Voltage $V_M$ is canceled so that the motor regains its zero flow rest position under the effect of spring 11. At a subsequent time $t_3$, a voltage of value E is reapplied to the motor during a time interval $T_b$ corresponding to a new flow $D_b$. At a time $t_3+T_b$, voltage $V_M$ is lowered again down to value $V_0$ to maintain the new flow. It is necessary to go through a rest step (between times $t_2$ and $t_3$) before establishing a new flow to preserve the zero flow origin and not the origin corresponding to the previous flow. This enables to accurately calibrate the control intervals as a function of the flows.

Of course, if voltage E is maintained too long, the maximum aperture of the valve (shown in FIG. 3), corresponding to the maximum flow, is obtained.

According to the invention, two power values, E and $V_0$, are used to supply the motor, the first value E being intended to rotate the motor to the desired position for opening the valve and the second value $V_0$ being intended to maintain the motor still. This allows to greatly simplify the mechanical and electrical components of the valve according to the invention, to form a particularly inexpensive valve.

Figure 5:
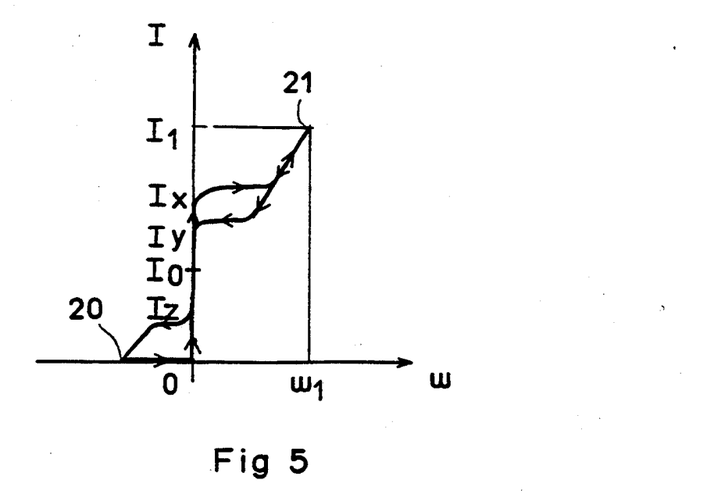
FIG. 5 is a curve illustrating the relation between the supply current of the electric motor used in a valve according to the invention and the rotation speed of this motor.

FIG. 5 is intended to show how, according to the invention, it is possible to maintain a constant aperture of the valve for any duration by applying to the electric motor 7 a specific current intensity $I_0$ corresponding to voltage $V_0$. First, it is assumed that motor 7 is not running. If the motor is supplied with a current I that slowly increases, the motor remains blocked because of friction in the whole mechanism until the current reaches a value $I_x$; from then, the motor starts rotating all the faster as the intensity increases until it reaches the speed $w_1$ corresponding to voltage E or an intensity $I_1$ (referenced 21 in FIG. 5). Then, if the current in the motor is progressively decreased, the motor progressively slows down until the current reaches an intensity $I_y$. At that point, the motor remains blocked until the intensity decreases to a value $I_z$, where the motor starts rotating counter-clockwise, under the influence of spring 11, until part 3 abuts against its end position. Intensities $I_x$ and $I_y$ are comprised between $I_0$ and $I_1$ and intensity $I_z$ is comprised between 0 and $I_0$. In any case, if the supply current of the motor is within the range $I_z$ to $I_y$, the motor stays still. This immobility range is caused by the fact that the friction of the mechanism driven by the electric motor 7 is substantially equal for the two rotation directions of the motor. Intensity $I_0$ is selected to be in the middle of this range, between intensities $I_z$ and $I_y$, so that this intensity $I_0$ always remains within the immobility range of the motor, even if the friction in the mechanism happens to slightly vary. If the mechanism was friction-free, there would not be any discontinuity in the curve shown in FIG. 5; it would extend along a substantially straight line between the ends 20 and 21 of this curve. In that case, the value $I_0$ of the intensity for which the motor would not rotate in either direction would be a single value, which would not provide, in practice, the certainty that the motor stays still. However, since all mechanisms of the gear-type have a friction that can be calculated with a relative accuracy, it will always be possible, in an effective mechanism, to determine a value for the supply intensity $I_0$ for which the motor is blocked, whatever be the control operation.

Figure 6:
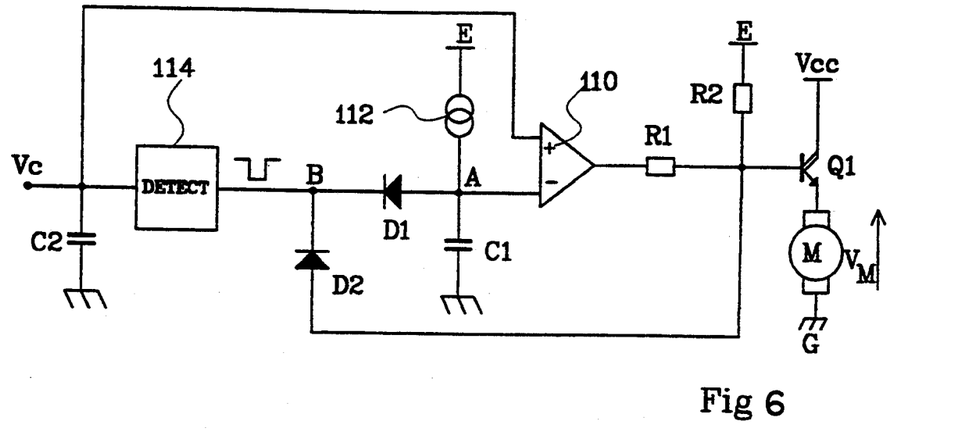
FIG. 6 schematically shows an embodiment of a control circuit according to the invention, capable of generating the control power of FIG. 4.

FIG. 6 schematically shows an embodiment of a control circuit for controlling a valve, such as that of FIGS. 1-3, according to the waveform of FIG. 4. A dc motor M (corresponding to motor 7 of FIGS. 1-3), is connected to a reference potential G, such as ground, and controlled by a Darlington transistor Q1 connected to a supply voltage Vcc. Transistor Q1 is connected as a follower and its base is controlled through a resistor bridge R1,R2 connected between a constant voltage E and the output of a comparator 110. In a preferred embodiment, this comparator F 110 has an open collector output, that is, when the state of the comparator is low, the output is connected to ground, and when the state is high, the output is at high impedance.

The non-inverting input of comparator 110 is provided with a flow reference voltage Vc that can be provided by a manual potentiometer or by an installation using the controlled valve. This voltage Vc is variable between 0 and value E. The inverting input of comparator 110 is connected to a junction node A between a capacitor C1 connected to ground and a current source 112 connected to voltage E.

The reference voltage Vc is also applied to the input of a variation detector 114, the output B of which is connected to node A and to the base of transistor Q1 respectively through two diodes D1 and D2 arranged with their cathodes connected to node B. A capacitor C2 is connected between the input of detector 114 and ground to smooth abrupt variations of reference voltage Vc. The operation of this circuit will be described by referring to the waveforms of FIGS. 7A-7C.

Figure 7A:
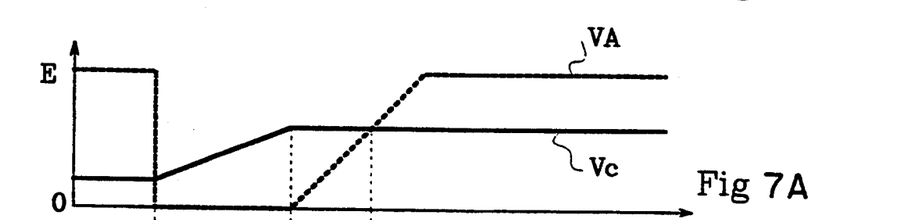
FIGS. 7A–7C show waveforms of signals in different nodes of the circuit of FIG. 6.
Figures 7B, 7C:
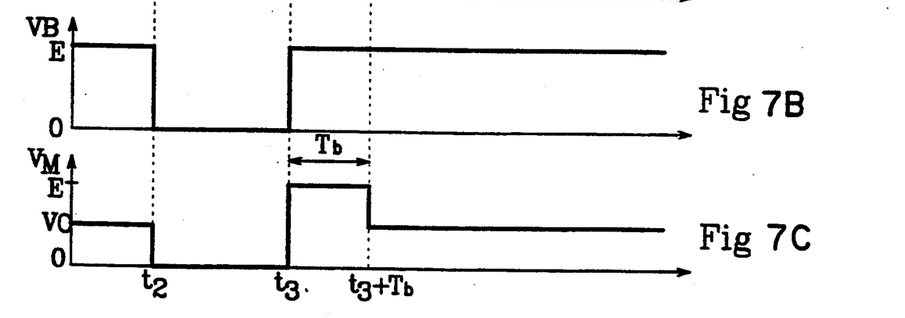

FIG. 7A shows by a bold line the waveform of reference voltage Vc during a flow increase demand and, by a dashed line, the waveform of voltage VA resulting at node A. FIG. 7B shows the waveform of the output voltage VB of detector 114. FIG. 7C shows the waveform of the voltage $V_M$ across the motor.

Until a time $t_2$, corresponding for example to time $t_2$ of FIG. 4, reference voltage Vc is constant and equal to a low value. The output voltage VB of the detector is at an inactive value corresponding to constant voltage E, or to any other voltage greater than the maximum value of voltage Vc, such as the supply voltage Vcc. Thus, diode D1 is blocked and allows capacitor C1 to charge up to its maximum value E. The voltage at the inverting input of comparator 110 then being greater than the reference voltage Vc at the non-inverting input, the output of the comparator 110 is at its low value 0. Thus, a voltage $V_0$ is applied across the motor, which is practically equal to voltage E divided by the ratio of bridge R1, R2. As it has been previously mentioned, voltage $V_0$ is insufficient for rotating the motor, but is sufficient for maintaining the motor in its position against the force of the above mentioned spring (11). The output voltage of bridge R1, R2 is not affected by diode D2 that is also blocked.

At time $t_2$, it is desired to increase the flow in the valve. From time $t_2$, reference voltage Vc progressively increases, delayed by capacitor C2, until a time $t_3$ when it reaches its new greater reference value. During the variation of voltage Vc, the output voltage VB of detector 114 is zero, which corresponds to an active level. Diode D1 becomes conductive and causes capacitor C1 to be discharged, which is represented by the fast canceling of voltage VA. Diode D2 also becomes conductive and causes the canceling of the output voltage of bridge R1, R2, and thus of voltage $V_M$ across the motor.

At time $t_3$, the reference voltage Vc stops varying and the output voltage of detector 114 returns to its inactive value E. Diodes D1 and D2 are blocked, capacitor C1 can thus be charged again and bridge R1, R2 is not inhibited any more. Voltage VA across capacitor C1 increases progressively until it reaches its maximum value E. Voltage VA has been represented increasing linearly, which depends on the nature of current source 112; if current source 112 is a resistor, voltage VA increases as an exponential function.

At a time $t_3+T_b$, voltage VA reaches reference voltage Vc. Between times $t_3$ and $t_3+T_b$, the output of comparator 10 is at its high state and a voltage $V_M$ is applied across the motor, which is practically equal to voltage E then present at the output of bridge R1, R2. At time $t_3+T_b$, the output of comparator 110 goes low and the conditions are as those receding time $t_2$, the motor being stopped in a new position determined by the delay $T_b$ for charging capacitor C1 from zero up to the new reference value Vc.

Figure 8:
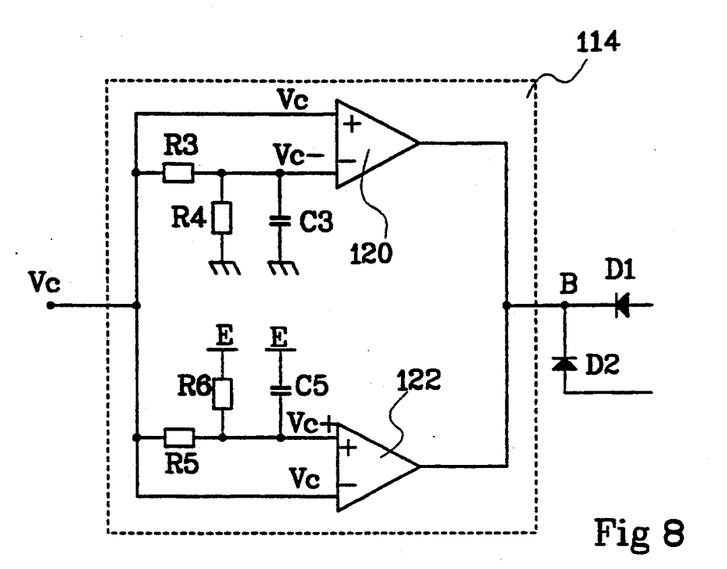
FIG. 8 shows an embodiment of a variation detector used in the circuit of FIG. 6.

FIG. 8 shows an embodiment of a variation detector 114. This detector comprises two open collector comparators, the outputs of which are connected together and constitute the output B of the detector circuit 114. A first comparator 120 is connected to detect a decrease of voltage Vc and a second comparator 122 is connected to detect an increase of voltage Vc.

The non-inverting input of comparator 120 directly receives voltage Vc and the inverting input receives this voltage Vc through a low-pass filter. The low-pass filter is here composed of an RC cell formed by a resistor R3 connected to voltage Vc and in series with a capacitor C3 connected to ground. A high value resistor R4 is connected between the inverting input of comparator 120 and ground for rendering, at rest, the voltage Vc- at the inverting input slightly lower than the voltage Vc at the non-inverting input. Thus, it is certain that the output of comparator 120 is inactive (high) at rest.

Comparator 122 is arranged symmetrically. Voltage Vc is directly applied to the inverting input of comparator 122 and, through an RC cell, to the non-inverting input of comparator 122. The RC cell is formed by a resistor R5 connected to voltage Vc and in series with a capacitor C5 that has been represented connected to voltage E. Capacitor C5 can be connected to any other constant voltage, such as ground. Voltage Vc+ at the non-inverting input of comparator 122 is fixed at a value slightly higher than voltage Vc of the inverting input by a high value resistor R6 connected to a voltage greater than Vc, such as voltage E. Thus, as for comparator 120, the output of comparator 122 is inactive (high) at rest.

When voltage Vc increases, voltage Vc+ at the non-inverting input of comparator 122 increases slower than voltage Vc at the inverting input of comparator 122 thanks to cell R5,C5. Thus, voltage Vc rapidly overtakes voltage Vc+ and the output voltage of comparator 122 goes low and is so maintained as long as voltage Vc continues to increase. Comparator 120 does not react because voltage Vc stays greater than voltage Vc- at the inverting input of comparator 120.

When voltage Vc decreases, the operation is symmetrical. Thanks to cell R3,C3, voltage Vc- at the inverting input of comparator 120 decreases slower than voltage Vc and the output of comparator 120 goes low. Here, comparator 122 does not react.

Thus, the output of such a detector, as described by referring to waveforms 7A–7C, is low when voltage Vc varies in either direction, and is at a state blocking diodes D1 and D2 when voltage Vc is constant.

Figure 9:
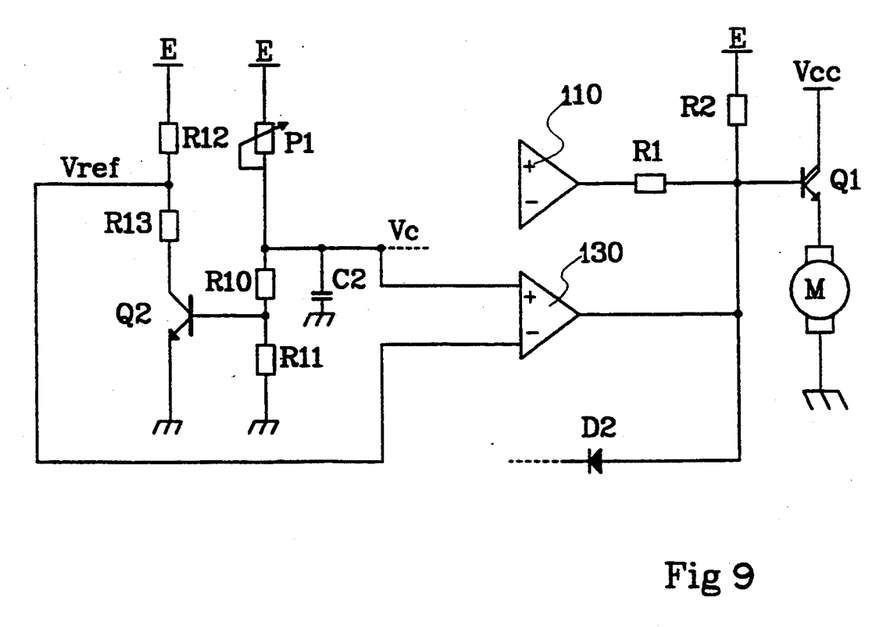
FIG. 9 shows optional circuits that can be combined to the circuit of FIG. 6.

FIG. 9 shows optional circuits that can be added to the circuit of FIG. 8. These circuits are intended to provide a frank canceling of the flow when the reference voltage Vc is near a value corresponding to a nearly zero flow.

The voltage Vc provided to the circuit of FIG. 8 is obtained at the junction node between a potentiometer P1 connected to voltage E and a resistor bridge R10,R11 connected to ground. Resistor bridge R10,R11 controls the base of a transistor Q2 having its emitter connected to ground. Another resistor bridge R12,R13 is connected between the collector of transistor Q2 and voltage E. At the output of this resistor bridge R12,R13 is taken a reference voltage Vref.

The output of bridge R1,R2 of FIG. 8 is connected to the output of an open collector comparator 130. The non-inverting input of this comparator 130 receives reference voltage Vc and the inverting input reference voltage Vref. When voltage Vc is adjusted at a sufficiently great value, the output voltage of bridge R10,R11 is sufficiently great for controlling transistor Q2 that is then conductive., Bridge R12,R13 providing reference voltage Vref is selected so that voltage Vref is smaller than the minimum value of voltage Vc during its normal use. Thus, comparator 130 is not involved in the control of motor M when usual flows are adjusted.

When voltage Vc reaches a minimum value corresponding to an output voltage of bridge R10, R11 equal to the base-emitter voltage of transistor Q2, transistor Q2 blocks and voltage Vref reaches voltage E. Then, the output of comparator 130 goes low, which inhibits the control of motor M.

Many alternatives and modifications of the present invention will appear to those skilled in the art. In particular, those skilled in the art will be able to achieve in many ways the functions of the described circuits. Especially, comparator 110, current source 112, capacitor C1 and diode D1 can be replaced by a temporizer providing a pulse of a width determined by the reference voltage Vc, and reset by the output pulse of detector 114. Detector 114 can be achieved by a derivator, the output signal of which is rectified and inverted.

We claim:

1. A method for controlling a valve including a direct current motor reversibly engaged with a valve aperture adjusting part biased by elastic means so that, when the motor is not powered, the valve aperture adjusting part moves to establish a zero flow rest position, comprising the steps of:
   selecting a desired valve aperture flow position;
   determining a time interval required for the direct current motor to provide the desired valve aperture flow position;
   throughout the duration of said time interval, supplying the motor with a first constant current of a sufficient value for rotating the motor against the force of said elastic means to move a valve element to said desired valve aperture flow position;
   supplying the motor with a second constant low value current after said time interval until a next valve aperture flow position has been selected, said low value current being insufficient to rotate the motor but sufficient to hold the motor in its position against the force of said elastic means for maintaining said valve element in said desired valve aperture desired position.

2. A method as claimed in claim 1, wherein the supply current of the motor is first cancelled when said valve aperture flow position is selected, so that the valve aperture adjusting part moves to establish said zero flow rest position before supplying said first constant current during said time interval.

3. A circuit for controlling a valve including a direct current motor reversibly engaged with a valve aperture adjusting part biased by elastic means so that, when the motor is not powered, the valve aperture adjusting part moves to establish a zero flow rest position, comprising:
   a selection means for selecting a desired valve aperture flow position and determining a time interval required for the direct current motor to provide said desired valve aperture flow position; and
   a power supply device for supplying said motor with a first constant current throughout the duration of said time interval, said first current being of a sufficient value to rotate the motor against the force of said elastic means for moving a valve element to said desired valve aperture flow position, said power supply device supplying said motor with a second constant low value current after said time interval until a next valve aperture flow position selection has been established, said low value current being insufficient to rotate the motor but sufficient to hold the motor in its position against the force of said elastic means for maintaining said value element in said desired valve aperture desired position.

4. A circuit as claimed in claim 3, comprising means for first cancelling the current supplied to the motor when said valve aperture flow position is selected, so that the valve aperture adjusting part moves to establish said zero flow rest position before supplying said first constant current during said time interval.

5. A circuit as claimed in claim 3, comprising:
   a voltage variation detector receiving as an input a valve aperture reference voltage and providing a detection signal at an active state as long as the reference voltage varies;
   a temporizer operable to be initialized by said active state and to count a delay determined by said reference voltage; and
   means associated to said temporizer for providing the motor with a zero voltage sufficient for rotating the motor when the temporizer counts said delay, and with a voltage sufficient for maintaining the motor in its position at the end of said delay.

6. A circuit as claimed in claim 5, wherein said temporizer comprises a comparator comparing said reference voltage with the voltage across a capacitor charged by a current source, a switching means being placed between said capacitor and the output of the detector for discharging the capacitor when the detection signal is active.

7. A circuit as claimed in claim 6, wherein said means associated to the temporizer comprise a dividing bridge connected between the output of the comparator and a high voltage, the signal present at an intermediate node of said dividing bridge being amplified in current and applied across the motor, a switching means being placed between said intermediate node of the bridge and the output of the detector for canceling the voltage at this intermediate node when the detection signal is active.

8. A circuit as claimed in claim 5, wherein said detector comprises at least an arrangement constituted of a comparator receiving at an input said reference voltage and at the other input said reference voltage through a low-pass filter, and of a resistor connected between a suitable voltage and one of the inputs of the comparator so that said comparator supplies an inactive detection signal at rest.

9. A variable flow electrically controlled valve comprising, in a housing, a tube made of elastic material through which a fluid can flow, and a control device causing a variable pinching of said tube, wherein said control device comprises:

a valve aperture adjusting part mounted on an articulation of said housing and comprising a pressing area to pinch said tube as well as a toothed sector centered on the axis of the articulation;

a pinion mounted to rotate in said housing and forming with the toothed sector a reversible meshed gear;

a direct current electric motor engaged with said pinion to move said valve aperture adjusting part;

an elastic means biasing said valve aperture adjusting part so that, when the motor is not powered, the valve aperture adjusting part moves to establish a full pinching position of said tube;

a selection means for selecting a desired valve aperture flow position and determining a time interval required for said control device to provide said desired valve aperture flow position; and a power supply device for supplying said motor with a first constant current throughout the duration of said time interval, said first current being of a sufficient value for rotating the motor against the force of said elastic means to move a valve element to said desired valve aperture flow position, said power supply device supplying said motor with a second constant low value current after said time interval until a next valve aperture flow position selection has been established, said low value current being insufficient to rotate the motor but sufficient to hold the motor in its position against the force of said elastic means for maintaining said valve element in said desire valve aperture desired position.

10. A valve as claimed in claim 9, wherein the power supply device comprises means for first cancelling the current supplied to the motor when said valve aperture flow position is selected, so that the valve aperture adjusting part moves to establish said full pinching position before supplying said first constant current during said time interval.

* * * * *